(12) United States Patent
Peter et al.

(10) Patent No.: US 9,470,522 B2
(45) Date of Patent: Oct. 18, 2016

(54) SYSTEMS AND METHODS FOR UPDATING A SCALE OF A BAROMETRIC ALTIMETER ON AIRCRAFT

(75) Inventors: Wesley Peter, Karnataka (IN); Sabu Mathew, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 832 days.

(21) Appl. No.: 13/407,037

(22) Filed: Feb. 28, 2012

(65) Prior Publication Data
US 2013/0226375 A1    Aug. 29, 2013

(51) Int. Cl.
*G01D 18/00*    (2006.01)
*G01C 5/06*     (2006.01)

(52) U.S. Cl.
CPC ...................................... *G01C 5/06* (2013.01)

(58) Field of Classification Search
CPC ...................................................... G01C 5/06
See application file for complete search history.

(56) References Cited

U.S. PATENT DOCUMENTS

| | | | |
|---|---|---|---|
| 6,112,141 A * | 8/2000 | Briffe et al. | 701/14 |
| 7,389,164 B1 | 6/2008 | Conner et al. | |
| 2008/0195263 A1* | 8/2008 | Shehi | G01C 5/005 701/4 |
| 2008/0243316 A1 | 10/2008 | Sacle et al. | |
| 2008/0243319 A1 | 10/2008 | Coulmeau et al. | |

* cited by examiner

*Primary Examiner* — Yuen Wong
(74) *Attorney, Agent, or Firm* — Lorenz & Kopf, LLP

(57) ABSTRACT

Systems and methods for updating a scale of a barometric altimeter on aircraft are provided. The method, for example, may include, but is not limited to, receiving, by an aircraft communication system, barometric altimeter scale data corresponding to an atmospheric pressure at an airport, determining, by the processor, if the altitude of the aircraft is below a transition level for the airport, and adjusting, by the processor, the scale of the barometric altimeter based upon the received barometric altimeter scale data when the altitude of the aircraft is below the transition level for the airport.

15 Claims, 10 Drawing Sheets

700

1000

SYSTEMS AND METHODS FOR UPDATING A SCALE OF A BAROMETRIC ALTIMETER ON AIRCRAFT

TECHNICAL FIELD

The following relates to aircraft, and more particularly to systems and methods for updating a scale of a barometric altimeter on aircraft.

BACKGROUND

Barometric altimeters in aircraft are used to measure an altitude of the aircraft based on a selected barometric altimeter pressure scale. In order to measure the altitude relative to Mean Sea Level (MSL) at a specific location, a barometric altimeter is scaled to local pressure prevailing at the location reduced to MSL, also referred to as QNH. For measuring aircraft altitude relative to ground at a specific location, barometric altimeter is scaled to local pressure prevailing at the location, also referred to as QFE. Typically, a pilot of an aircraft must manually scale a barometric altimeter to QNH or QFE scale setting while flying below a fixed altitude. Aircraft are required to set the barometric scale to a standard pressure scale setting when flying over a fixed altitude, also referred to as QNE. This helps the aircraft maintain proper vertical separation with other aircraft. The manual process of barometric altimeter scale is prone to error and could lead to incorrect assessment of the altitude of the aircraft.

SUMMARY

In accordance with one embodiment, a method for automatically adjusting a scale of a barometric altimeter on an aircraft having a processor communicatively coupled to the barometric altimeter is provided. The method may include, but is not limited to, receiving, by an aircraft communication system, barometric altimeter scale data corresponding to an atmospheric pressure at an airport, determining, by the processor, if the altitude of the aircraft is below a transition level for the airport, and adjusting, by the processor, the scale of the barometric altimeter based upon the received barometric altimeter scale data when the altitude of the aircraft is below the transition level for the airport.

In accordance with another embodiment, an aircraft is provided. The aircraft may include, but is not limited to, a processor and a barometric altimeter communicatively coupled to the processor, the barometric altimeter configured to measure an altitude of the aircraft, wherein the processor is configured to update a scale of the barometric altimeter based upon the altitude of the aircraft.

In accordance with yet another embodiment, a system for updating a scale of a barometric altimeter on an aircraft is provided. The system may include, but is not limited to, a processor communicatively coupled to the barometric altimeter, wherein the processor is configured to automatically update a scale of the barometric altimeter based upon the altitude of the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, a system and method for automatically adjusting a scale of a barometric altimeter on an aircraft is provided. The aircraft includes a communications system capable of receiving a digital message including the barometric altimeter scale data. The aircraft further includes a processor capable of parsing the digital message and automatically updating a scale of the barometric altimeter, as discussed in further detail below.

Figure 1:
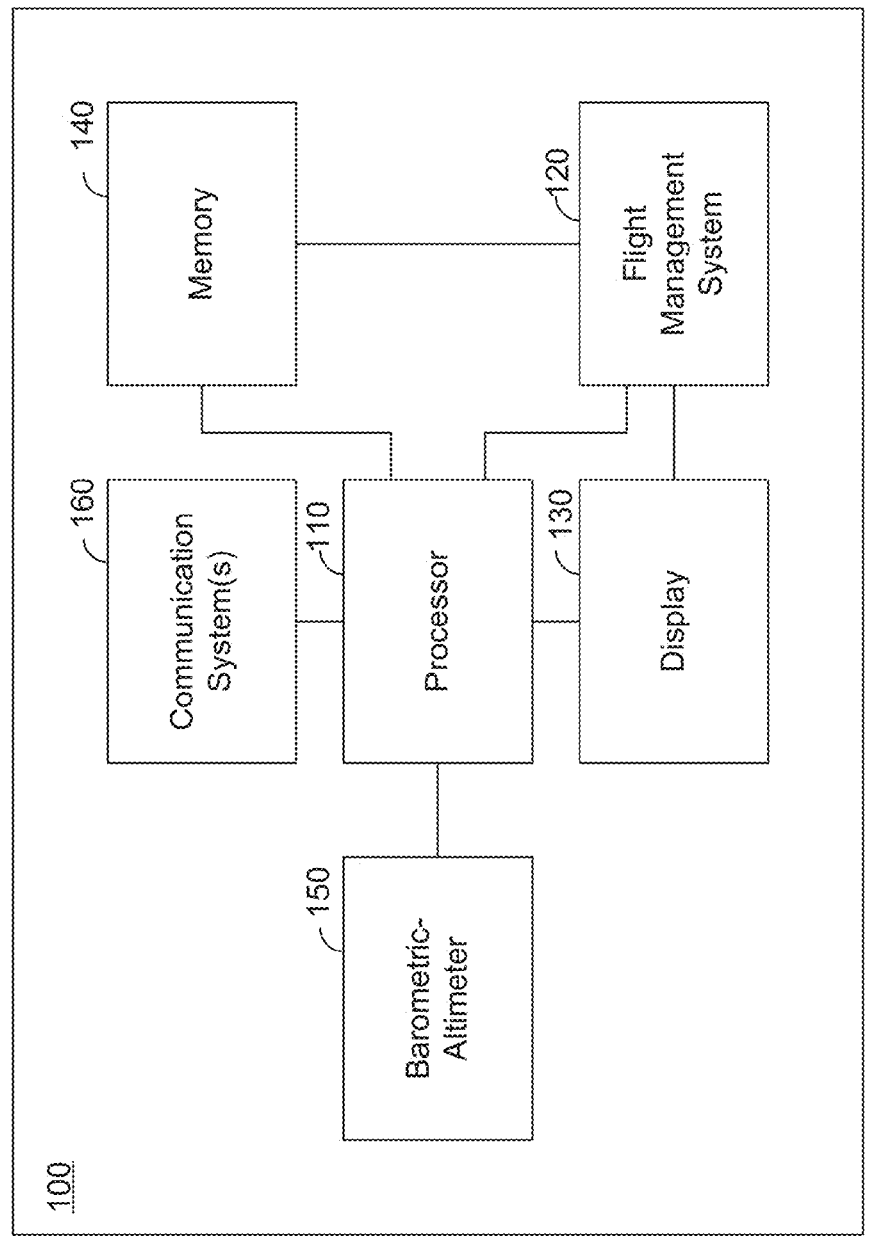
FIG. 1 is a block diagram of an exemplary aircraft, in accordance with an embodiment.

FIG. 1 is a block diagram of an exemplary aircraft 100, in accordance with an embodiment. The aircraft 100 may be any type of aircraft or spacecraft. In one embodiment, for example, the aircraft 100 may be a fixed wing aircraft, such as an airplane. The aircraft 100 also includes a processor 110. The processor 110 may be any type of processor. For example, the processor 110 could be a central processing unit, a graphical processing unit, a physics processing unit, an application specific integrated circuit, a microprocessor, a field programmable gate array or any other type of logic device or combination thereof.

The aircraft 100 also includes a flight management system (FMS) 120. The FMS 120 is computer system that automates a wide variety of in flight tasks, reducing the workload on the flight crew. One function of the FMS 120, for example, is in flight management of a flight plan. The FMS 120 may be coupled to various sensors (not illustrated) to determine a position of the aircraft 100 and guide the aircraft 100 along the flight plan. In one embodiment, for example, the processor 110 could be part of the FMS 120, or part of another system within the aircraft 100. The processor and/or the FMS 120 are coupled to at least one memory 140. The memory 140 may include a navigational database for storing navigational data.

The aircraft 100 further includes at least one display 130. The display could be, for example, a cathode ray tube (CRT) display, a liquid crystal (LCD) display, a heads up display (HUD) or any other type of display. The display 130 is communicatively coupled to the processor 110 and/or the FMS 120. The processor 110 and/or FMS 120 may display altitude data for the aircraft, as discussed in further detail below.

The aircraft 100 further includes a barometric altimeter 150. The barometric altimeter measures an altitude of the aircraft 100 based upon an atmospheric pressure experienced by the aircraft 100. In one embodiment, for example, the barometric altimeter may measure the atmospheric pressure around the aircraft in units of Pascal. In another embodiment, for example, the barometric altimeter may measure the atmospheric pressure around the aircraft in units of inches of mercury.

The barometric altimeter 150 can be scaled to account for differences in atmospheric pressure that occur, for example, because of local weather patterns. Aircraft that are flying above a transition altitude are required to scale their barometric altimeters based upon a baseline pressure of 1013.25 hectopascals (hPa) or 29.92 inches mercury (inches Hg), which is an air pressure at mean sea level in international standard atmosphere (ISA) conditions. In the aircraft industry, q codes are associated with various scales for barometric altimeters. The q code QNE, for example, is associated with the baseline pressure of 1013.25 hPa or 29.92 inches Hg. Because every aircraft is required to scale its respective barometric altimeter based upon QNE when flying above the transition altitude, a standard air pressure setting is universally used so all aircraft have a common scale setting. Accordingly, since there is a common scale, vertical separation with other aircraft can be more accurately maintained.

QNH, which is another q code used in the aircraft industry, is a barometric pressure scale adjusted to sea level that causes the altimeter to read altitude above mean sea level within a given region. QNH can vary by location and by local weather patterns. Air traffic controllers can digitally transmit the QNH for the airport so that aircraft landing at the airport have a more accurate altitude data for the region around that airport, as discussed in further detail below. As discussed above, the QNE q code standardizes the barometric pressure scale independent of weather conditions. Accordingly, if the QNE scale is used when an aircraft is attempting to land, the aircraft's barometric altimeter may not give an accurate altitude reading. In some countries a QFE scale is used rather than a QNH scale. QFE is the pressure setting on barometric scale which will cause an altimeter to read zero when at the reference datum of a particular airfield. In ISA temperature conditions the altimeter will read height above the datum in the vicinity of the airfield.

A crew member, while approaching/departing to/from an Airport, is required to change the Barometric Altimeter scale setting to either QNH or QNE depending upon the aircraft altitude. In some parts of the world QFE is used in place of QNH. Accordingly, while the remainder of the application will discuss using the QNH scale, one of ordinary skill in the art would recognize that the QFE scale can be easily replaced with the QNH scale, if so required.

When an aircraft is climbing from an airport, a crew member is required to switch from the QNH scale to the QNE scale when the aircraft crosses a transition altitude. Likewise, when an aircraft is on descent, for example, to an airport, a crew member is required to switch from the QNE scale to the QNH scale when the aircraft crosses a transition level. In the United States, the transition altitude is generally eighteen-thousand feet. However, airports in other parts of the world may have their own specific transition altitude.

The aircraft 100 further includes at least one communication system 160. In one embodiment, for example, the communication system 160 may be a controller pilot data link communication (CPDLC) system. CPDLC is a method by which air traffic controllers can exchange textual messages with crew members over a data link system. The air traffic controller is provided with the capability to send messages to a specific aircraft to issue level assignments, crossing constraints, lateral deviations, route changes and clearances, speed assignments, radio frequency assignments, and respond to various requests for information. The crew member is provided with the capability to respond to messages, to request clearances and information, to report information, and to declare/rescind an emergency. Additionally, the air traffic controller can transmit a altimeter scale setting, for example QNH, to the aircraft 100. The processor 110, or FMS 120, can parse the message and automatically update the barometric altimeter, as discussed in further detail below.

In another embodiment, for example, the communication system may be a digital automatic terminal information service (D-ATIS) system. D-ATIS systems can transmit runway and taxiway instructions, information on avionics equipment, frequency outages, local weather conditions, as well as barometric altimeter scale data. Similar to CPDLC messages, the D-ATIS messages are text based messages. D-ATIS system allows pilots to receive and read D-ATIS text messages using the aircraft's existing display format via data link services.

Figure 2:
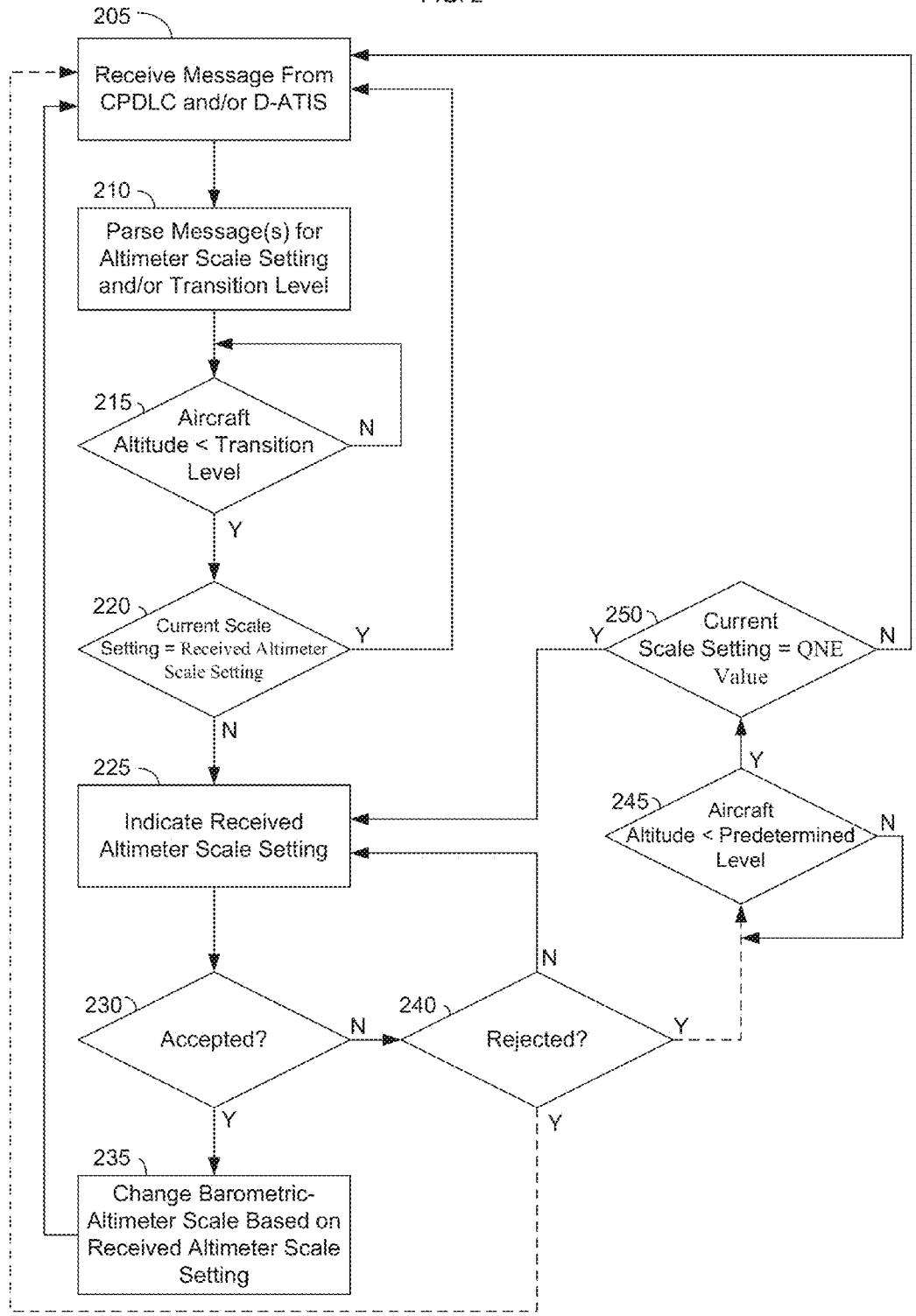
FIG. 2 is a flow chart illustrating an exemplary method for automatically updating a barometric altimeter scale, in accordance with an embodiment.

FIG. 2 is a flow chart illustrating an exemplary method 200 for automatically updating a barometric altimeter scale when a plane is descending, in accordance with an embodiment. The method begins when a communications system of an aircraft, such as communications system(s) 160 illustrated in FIG. 1, receives a digital message from air traffic control. (Step 205) As discussed above, the message may be a CPDLC message or a D-ATIS message. In some regions, the air traffic control may send out QNH scale data using both CPDLC and D-ATIS systems.

A processor, such as the processor 110 illustrated in FIG. 1, parses the message(s) for QNH scale data and/or transition level data. (Step 210). The processor then determines if the aircraft's altitude is below a transition level for the airport. (Step 215). If the aircraft is above the transition level, the processer continues to monitor the altitude of the aircraft. In one embodiment, for example, the processor may use the barometric altimeter to determine the altitude of the aircraft. The processor could also use data from an FMS, such as the FMS 120 illustrated in FIG. 1, to determine if the aircraft's decent below the transition level is part of an expected flight plan. For example, if the decent below the transition level is temporary according to the flight plan data, the processor may not request that the scale of the barometric altimeter be changed.

If the aircraft is below the transition level, the processor then determines if the current barometric altimeter scale setting is the same as the QNH scale data from the most recent air traffic control message. (Step 220). In one embodiment, for example, when both a CPDLC message and a D-ATIS message are received containing QNH or transition level data, the processor may only use the data received from the CPDLC message. As discussed above, CPDLC messages are communications directly sent to an aircraft from an air traffic controller. In contrast, D-ATIS messages are automated messages periodically broadcast to all aircraft in a region. Accordingly, the processor can assume that the QNH data in the CPDLC reflects the most recent atmospheric pressure in the region of the aircraft. If the current scale setting matches the QNH scale data from the most recent air traffic control message, the process returns to Step 205 to await receipt of a new message.

Figure 3:
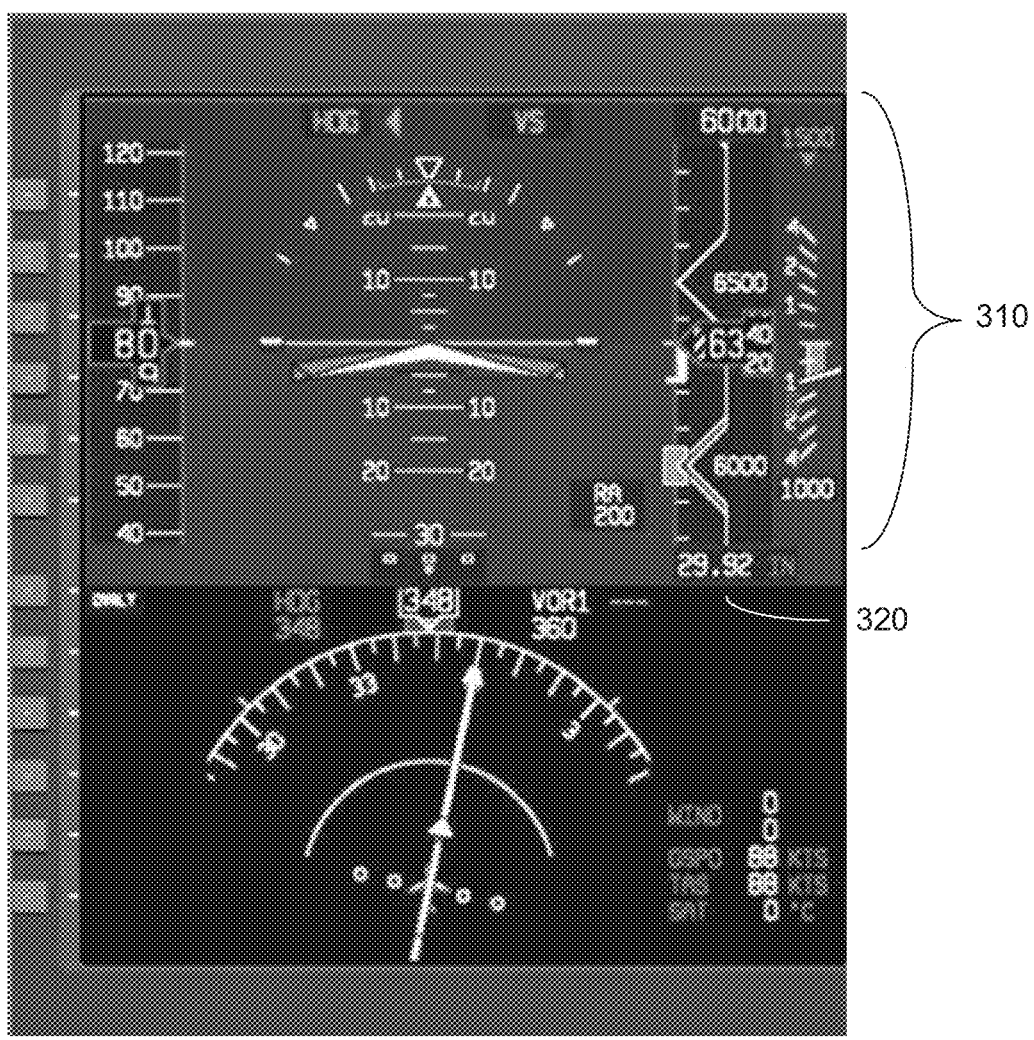
FIG. 3 illustrates an exemplary display on the aircraft, in accordance with an embodiment.
Figure 4:
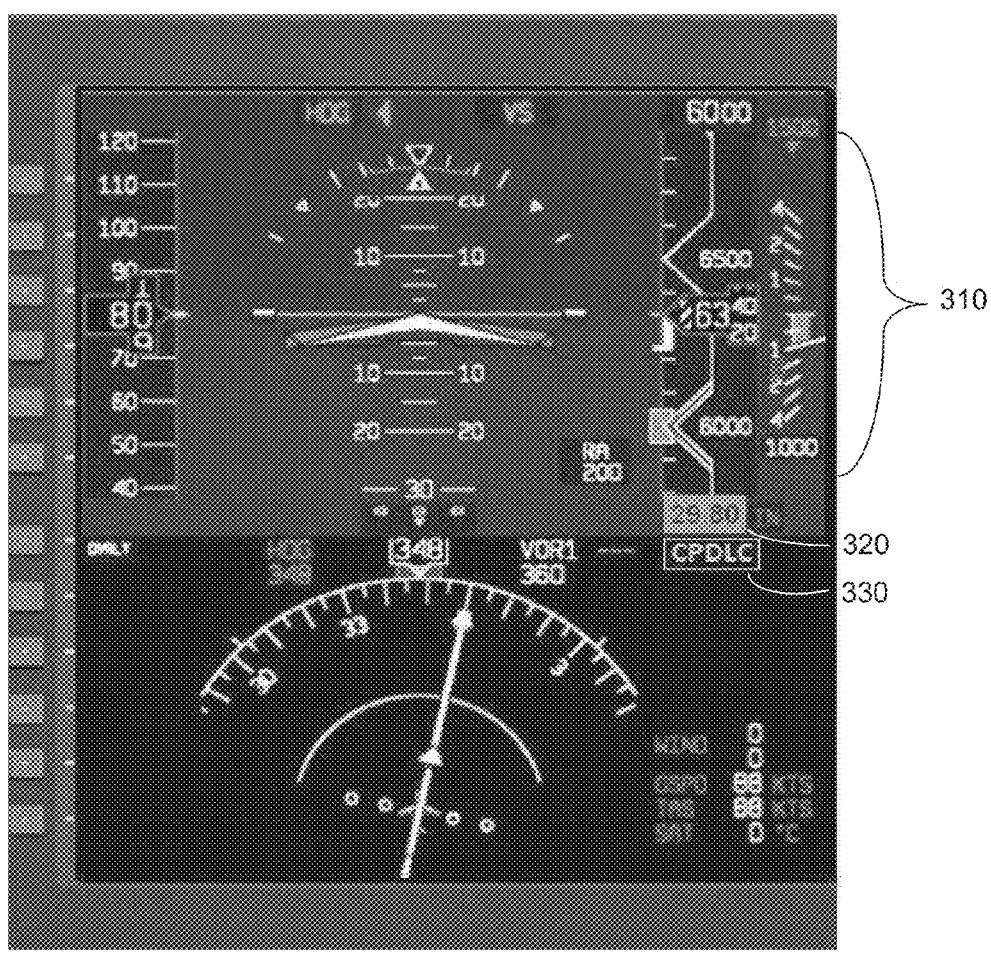
FIG. 4 illustrates the exemplary display of FIG. 3 after the processor has indicated that a new barometric altimeter scale should be used, in accordance with an embodiment.

If the current scale setting is not equal to the QNH scale data from the most recent air traffic control message, the processor indicates the new barometric altimeter scale setting on a display in the aircraft. (Step 225). FIG. 3 illustrates an exemplary display 300 on the aircraft, in accordance with an embodiment. The display includes data 310 from the barometric altimeter. The data 310 includes an indication 320 of the scale used to determine altitude by the barometric altimeter. As seen in FIG. 3, the indication 320 indicates that the barometric altimeter is using the standard QNE scale of 29.92 inches Hg. FIG. 4 illustrates the exemplary display 300 of FIG. 3 after the processor has indicated that a new barometric altimeter scale should be used, in accordance with an embodiment. As seen in FIG. 4, the indication 320 has changed from 29.92 inches Hg to 29.80 inches Hg. Furthermore, a background color of the indication 320 has changed to alert the pilot of the change. It should be noted, however, that the data 310 from the barometric altimeter has not changed since the new barometric altimeter scale setting has not been accepted by a crew member. The display 300 further includes a source notification 330. The source notification 330 indicates the source of barometric altimeter scale setting (i.e., CPDLC, D-ATIS, etc.).

Returning to FIG. 2, the indication in Step 225 may be an audio or visual alert, or a combination thereof. For example, as seen in FIG. 4, a background color of a scale indication was changed. The processor may also cause an audible beep or other audible sound to bring the pilot's attention to the new scale setting. In one embodiment, for example, an audible reminder to change the barometric altimeter scale may begin if a crew member has not accepted or rejected the scale change within a predetermined amount of time.

Figure 5:
FIG. 5 illustrates an exemplary instrument interface for an aircraft, in accordance with an embodiment.

After the new barometric altimeter scale is presented to the crew, a crew member is given the option to accept the scale change. (Step 230). FIG. 5 illustrates an exemplary instrument interface 500 for an aircraft, in accordance with an embodiment. The instrument interface 500 includes a barometric altimeter scale update interface 510. In one embodiment, for example, the interface includes an accept button 520, a reject button 530 and an indictor 540. The indicator 540, for example, may be a light which lights up when a message including an updated barometric altimeter scale setting has been received. Accordingly, from the crew members' perspective, with the single push of one of the accept button 520, the scale of the barometric altimeter can be updated. Returning to FIG. 2, if the new scale setting is accepted, the scale of the barometric altimeter is updated. (Step 235). The process then returns to Step 205 to see if a new message with a different QNH scale is received. If the new scale for the barometric altimeter is not accepted, the processer determines if the scale setting has been rejected. (Step 240). A crew member may reject an automatic change to the barometric altimeter scale, for example, if the aircraft is only temporarily going to be under the transition level or if the scale has already been changed. In some instances, air traffic control may verbally relay a different QNH scale to the crew of the aircraft. Accordingly, in some circumstances, the crew may need to reject the automatic change to the scale of the barometric altimeter. If the scale has not been rejected, the process returns to Step 225 to indicate that a new scale setting is available. In one embodiment, for example, the processer may initiate escalating indication signals to the crew members in order to bring their attention to the scale change. The escalating signals may include audio signals, video signals, or any combination thereof.

In one embodiment, for example, if the scale change is rejected, the process may return to Step 205 to await receipt of a new message including QNH data. In another embodiment, for example, the processor may determine if an altitude of the aircraft is below a predetermined level which is less than the transition level. (Step 245). The predetermined level may indicate that the aircraft is in a landing stage. The processor may also consult the flight plan in an FMS to determine if the aircraft is in a landing phase. If the aircraft is above the predetermined level or not in a landing stage, the processor may continue to monitor the altitude of the aircraft. If the aircraft is below the predetermined altitude or in a landing stage, the processor may compare the current scale setting to the QNE setting. (Step 250). If the current scale setting for the barometric altimeter is still the QNE scale, indicating that the scale setting for the barometric altimeter had not been changed, the process may return to Step 225 to indicate that a new scale setting is available. In this embodiment, the processor may also escalated the indication signals to get the attention of the crew. If the scale setting was not equal to the QNE scale, indicating that the barometric altimeter scale had been changed, but not to the scale setting in the received message (e.g., if air traffic control verbally transmitted a different scale setting), the process may return to Step 205 to await receipt of a new message containing QNH data.

Figure 6:
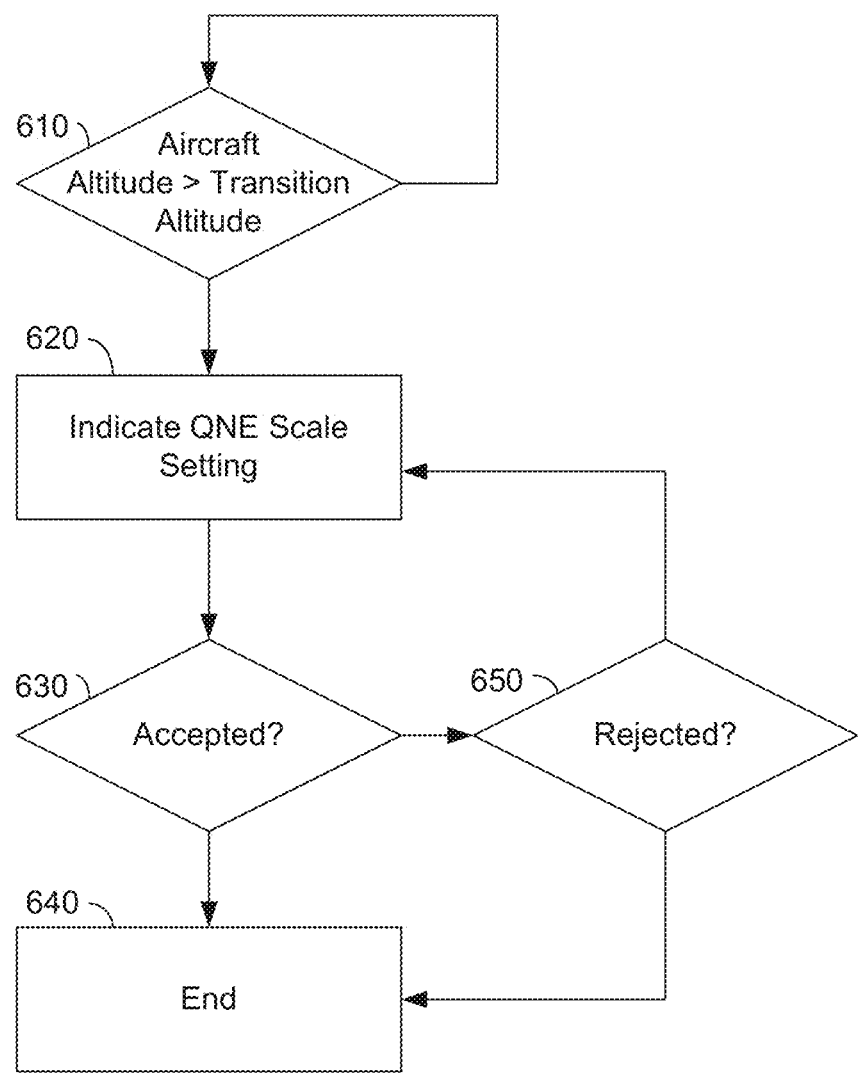
FIG. 6 is a flow chart illustrating another exemplary method for automatically updating a barometric altimeter scale, in accordance with an embodiment.

FIG. 6 is a flow chart illustrating another exemplary method 600 for automatically updating a barometric altimeter scale, in accordance with an embodiment. When an aircraft is climbing from an airport or from a lower altitude, a processor, such as the processor 110 illustrated in FIG. 1, monitors an altitude of the aircraft to determine if the aircraft has climbed above the transition altitude. (Step 610). The processor then causes the QNE scale to be displayed on a display, such as the display 130 in FIG. 1. (Step 620). As discussed above, the processor may also use a visual cue, such as a color or a flashing background, to bring a crew member's attention to the barometric altimeter scale change. The processor then determines if the scale change has been accepted. (Step 630). As discussed above, FIG. 5 illustrates an exemplary instrument interface 500 for an aircraft, in accordance with an embodiment. The instrument interface 500 includes a barometric knob 510. In one embodiment, for example, the accept button 520 can be pushed to confirm the new barometric altimeter scale settings. Accordingly, from a crew members perspective, with the single push of the button 520, the scale of the barometric altimeter can be updated.

If the scale change has been accepted the processor continues to monitor the altitude of the aircraft to see if the aircraft goes below a transition level for a region (i.e., the method illustrated in FIG. 2). (Step 640). If the scale change has not been accepted, the processor determines in the scale change has been rejected. (Step 650). As discussed above, a crew member can press a reject button 530, as illustrated in FIG. 5, the actively reject the barometric altimeter scale update. If the scale change was not rejected, the processor returns to Step 620 and continues to indicate the QNE scale setting change. In one embodiment, for example, if the scale change has not been accepted or rejected in a predetermined amount of time, the processor may begin escalating the audio and/or visual indications of the scale change. If the scale change was rejected, the processor continues to monitor the altitude of the aircraft to see if the aircraft goes below a transition level for a region (i.e., the method illustrated in FIG. 2). (Step 640).

Figure 7:
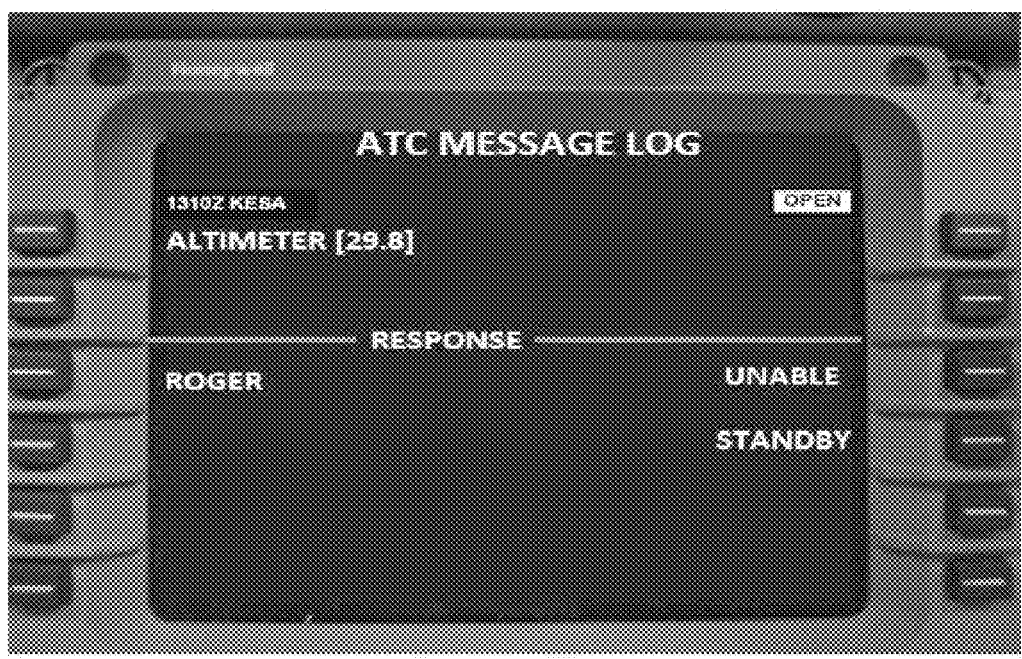
FIG. 7 illustrates an exemplary a control and display unit, in accordance with an embodiment.

FIGS. 7-10 illustrate other barometric altimeter scale update interfaces, in accordance with various embodiments. FIG. 7 illustrates an exemplary a control and display unit (CDU) 700. The CDU 700 could also be used to accept or reject a barometric altimeter scale setting received via a CPDLC message. As seen in FIG. 7, upon receipt of a barometric altimeter scale setting, the crew of the aircraft is presented with options "ROGER," "UNABLE," and "STANDBY." By selecting "ROGER," a processing system, such as the processor 110 illustrated in FIG. 1, updates the barometric altimeter scale and also issues a response through the CPDLC system to the air traffic control indicating that the scale setting was accepted. Likewise, if the crew member selected "UNABLE," the processing system rejects the scale setting and issues the "UNABLE" message indicating to the air traffic control that the scale setting was rejected. If the "STANDBY" button is selected, the processing system issues a message requesting more time from the air traffic controllers.

Figure 8:
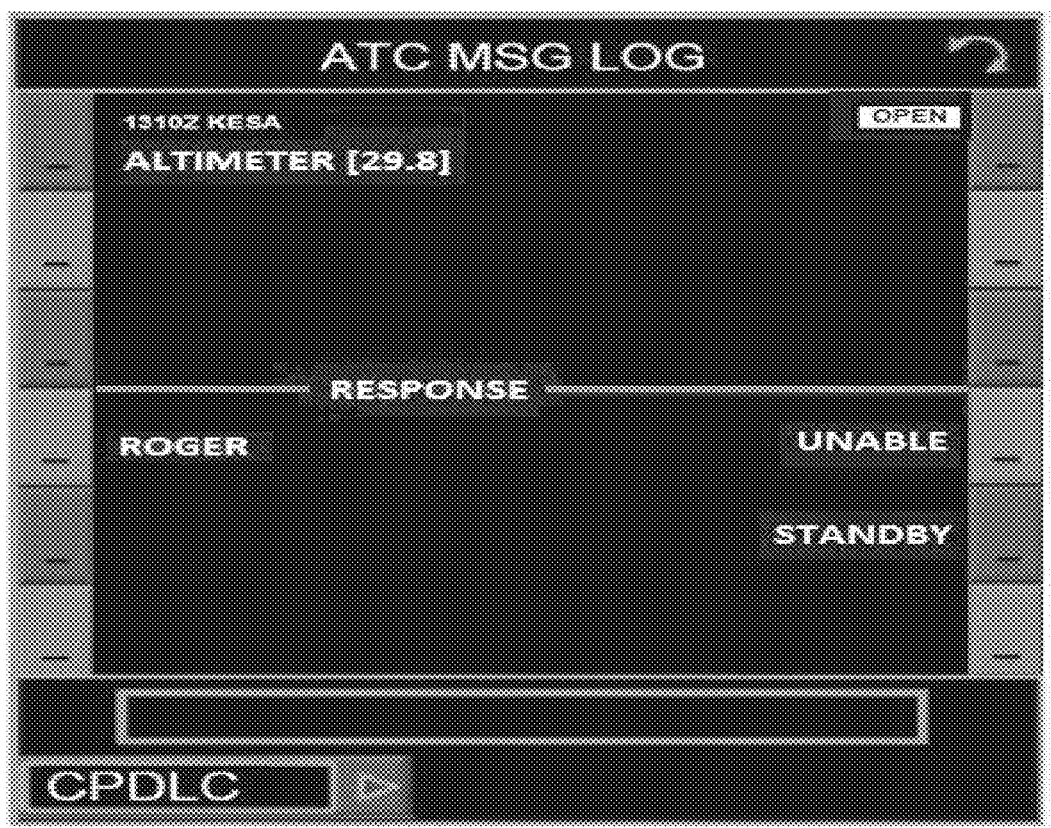
FIG. 8 illustrates an exemplary a multi-function display, in accordance with an embodiment.

FIG. 8 illustrates an exemplary multi-function display (MFD) 800. The MFD 800 could also be used to accept or reject a barometric altimeter scale setting received via a CPDLC message. As seen in FIG. 8, the crew of the aircraft is presented with the "ROGER," "UNABLE," and "STANDBY" options after receiving a barometric altimeter scale setting change via a CPDLC message, as illustrated in the upper portion of the MFD display 800.

Figure 9:
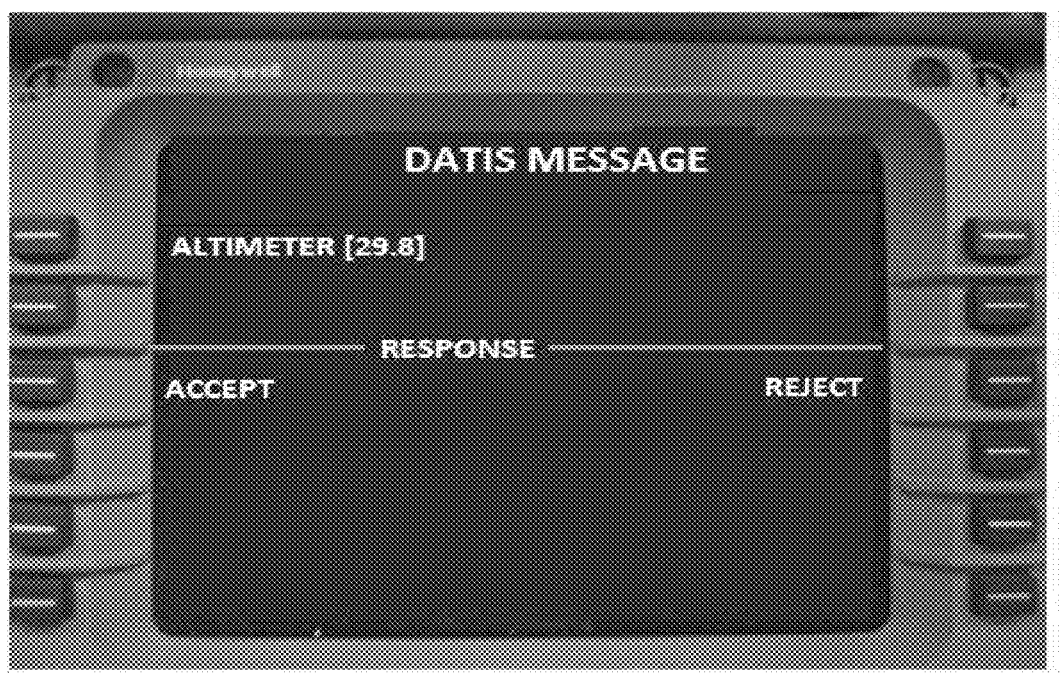
FIG. 9 illustrates another exemplary control and display unit, in accordance with an embodiment.

FIG. 9 illustrates another exemplary a control and display unit (CDU) 900. The CDU 900 could also be used to accept or reject a barometric altimeter scale setting received via a D-ATIS message. As seen in FIG. 9 upon receipt of a barometric altimeter scale setting, the crew of the aircraft is presented with options "ACCEPT" and "REJECT." By selecting "ACCEPT," a processing system, such as the processor 110 illustrated in FIG. 1, updates the barometric altimeter scale and also issues a response through the D-ATIS system to the air traffic control indicating that the scale setting was accepted. Likewise, if the crew member selected "REJECT," the processing system rejects the scale setting and issues the "REJECT" message indicating to the air traffic control that the scale setting was rejected.

Figure 10:
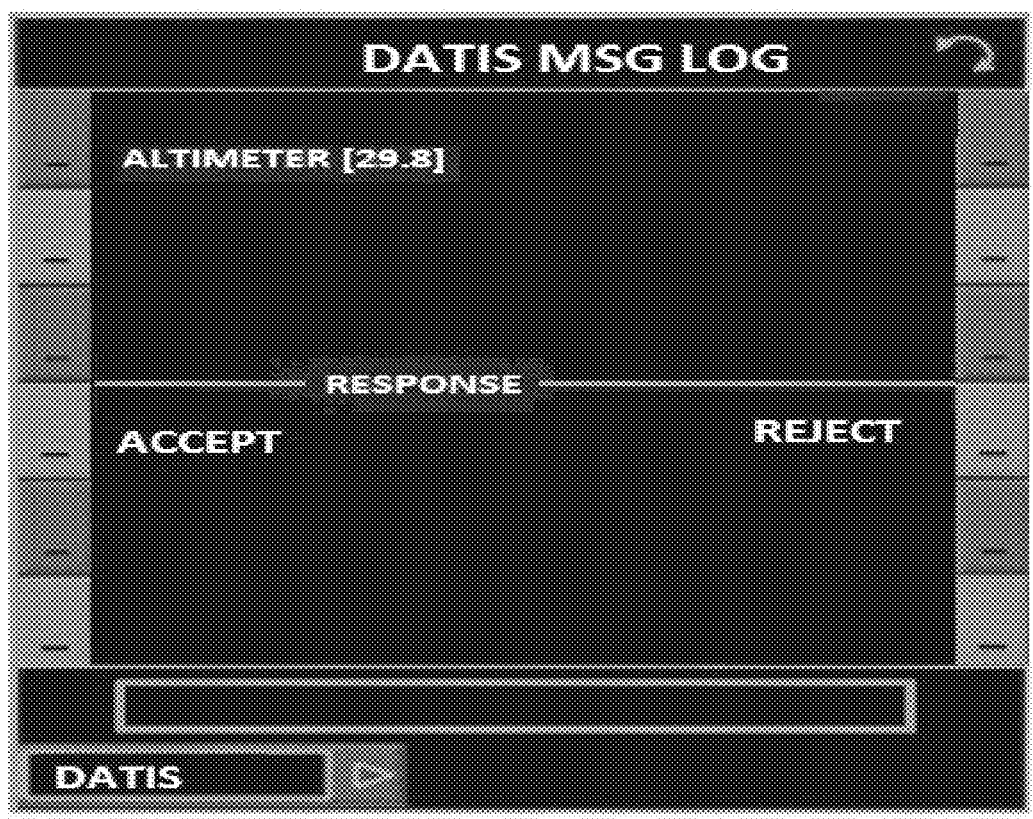
FIG. 10 illustrates another exemplary multi-function display, in accordance with an embodiment.

FIG. 10 illustrates another exemplary multi-function display (MFD) 1000. The MFD 1000 could also be used to accept or reject a barometric altimeter scale setting received via a D-ATIS message. As seen in FIG. 10, the crew of the aircraft is presented with the "ACCEPT" and "REJECT" options after receiving a barometric altimeter scale setting change via a D-ATIS message, as illustrated in the upper portion of the MFD display 1000.

While FIGS. 7-10 illustrate CDU or MFD interfaces where a crew member can accept or reject a barometric altimeter scale setting by selecting a button on the side of the respective displays, the CDU and/or MFD displays can also be implemented using touch screens.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the embodiments in any way. To the contrary, various changes may be made in the function and arrangement of the various features described herein without departing from the scope of the claims and their legal equivalents.

What is claimed is:

1. A method for automatically adjusting a scale of a barometric altimeter on an aircraft having a processor communicatively coupled to the barometric altimeter, the method comprising:
   receiving, by an aircraft communication system, a digital message including barometric altimeter scale data corresponding to an atmospheric pressure at an airport;
   determining, by the processor, when an altitude of the aircraft is below a transition level for the airport;
   comparing, by the processor, the received barometric altimeter scale data with a current scale setting of the barometric altimeter;
   indicating, on an aircraft display, the received barometric altimeter scale data when the received barometric altimeter scale data is different from the current scale setting of the barometric altimeter; and
   adjusting, by the processor, the scale of the barometric altimeter based upon the received barometric altimeter scale data when the altitude of the aircraft is below the transition level for the airport.

2. The method of claim 1, further comprising:
   receiving, by the processor, acceptance of the received barometric altimeter scale data,
   wherein the adjusting further comprises automatically adjusting the scale of the barometric altimeter based upon the received barometric altimeter scale data when the altitude of the aircraft is below the transition level for the airport and the processor received acceptance.

3. The method of claim 1, wherein the indicating further comprising indicating, by a speaker communicatively coupled to the processor, the received barometric altimeter scale data.

4. The method of claim 1, further comprising:
   receiving, by the processor, a rejection of the received barometric altimeter scale data;
   comparing, by the processor, the altitude of the aircraft to a predetermined level below the transition level; and
   indicating, on the aircraft display, the received barometric altimeter scale data when the aircraft is below the predetermined level.

5. An aircraft, comprising:
   a processor;
   a barometric altimeter communicatively coupled to the processor, the barometric altimeter configured to measure an altitude of the aircraft;
   a display communicatively coupled to the processor; and
   a communications system communicatively coupled to the processor,
   wherein the processor is configured to:
      receive, from the communications system, a digital message;
      parse the digital message for barometric altimeter scale data;
      display an updated scale for the barometric altimeter on the display based upon the altimeter scale data parsed from the digital message; and
      update a scale of the barometric altimeter based upon the altitude of the aircraft and the barometric altimeter scale data after receiving acceptance of the displayed updated scale.

6. The aircraft of claim 5, wherein the processor is further configured to monitor the altitude of the aircraft and update the scale of the barometric altimeter when the aircraft descends below a predetermined transition level.

7. The aircraft of claim 5, wherein the processor is further configured to:

parse the digital message for transition level data; and
update the scale of the barometric altimeter based upon the altitude of the aircraft and the transition level data.

8. The aircraft of claim 5, wherein the processor is further configured to monitor the altitude of the aircraft and update the scale of the barometric altimeter when the aircraft transcends a predetermined transition altitude.

9. The aircraft of claim 5, further comprising a barometric altimeter scale update interface communicatively coupled to the processor, wherein the barometric altimeter scale update interface is configured to send the acceptance of the displayed updated scale to the processor when an accept button is pressed.

10. The aircraft of claim 5, wherein the barometric altimeter scale data is QNH data, QFE data or QNE data.

11. A system for updating a scale of a barometric altimeter on an aircraft, comprising:
a processor communicatively coupled to the barometric altimeter;
a display communicatively coupled to the processor; and
a communications system communicatively coupled to the processor,
wherein the processor is configured to:
receive, from the communications system, a digital message;
parse the digital message for barometric altimeter scale data;
display an updated scale for the barometric altimeter on the display based upon the altimeter scale data parsed from the digital message; and
update the scale of the barometric altimeter based upon an altitude of the aircraft and the barometric altimeter scale data after receiving acceptance of the displayed updated scale.

12. The system of claim 11, wherein the processor is further configured to monitor the altitude of the aircraft and update the scale of the barometric altimeter when the aircraft descends below a predetermined transition level.

13. The system of claim 11, wherein the processor is further configured to:
parse the digital message for transition level data; and
update the scale of the barometric altimeter based upon the altitude of the aircraft and the transition level data.

14. The system of claim 11, wherein the processor is further configured to monitor the altitude of the aircraft and update the scale of the barometric altimeter when the aircraft transcends a predetermined transition altitude.

15. The system of claim 11, further comprising a barometric altimeter scale update interface communicatively coupled to the processor, wherein the barometric altimeter scale update interface is configured to send the acceptance of the displayed updated scale to the processor when an accept button is pressed.

* * * * *